United States Patent
Boecker et al.

(10) Patent No.: US 11,674,483 B2
(45) Date of Patent: Jun. 13, 2023

(54) SUCKING JET PUMP ARRANGEMENT

(71) Applicant: TI Automotive Technology Center GmbH, Rastatt (DE)

(72) Inventors: Albert Boecker, Ettlingen (DE); Thorsten Schaefer, Landau (DE)

(73) Assignee: TI AUTOMOTIVE TECHNOLOGY CENTER, GMBH, Rastatt (DE)

( * ) Notice: Subject to any disclaimer, the term of this patent is extended or adjusted under 35 U.S.C. 154(b) by 405 days.

(21) Appl. No.: 16/958,521

(22) PCT Filed: Dec. 20, 2018

(86) PCT No.: PCT/IB2018/060459
§ 371 (c)(1),
(2) Date: Jun. 26, 2020

(87) PCT Pub. No.: WO2019/130182
PCT Pub. Date: Jul. 4, 2019

(65) Prior Publication Data
US 2021/0054812 A1 Feb. 25, 2021

(30) Foreign Application Priority Data
Dec. 29, 2017 (EP) .................................... 17211129

(51) Int. Cl.
*F02M 37/02* (2006.01)
*F04F 5/44* (2006.01)
*B60K 15/077* (2006.01)

(52) U.S. Cl.
CPC ......... *F02M 37/025* (2013.01); *B60K 15/077* (2013.01); *F04F 5/44* (2013.01)

(58) Field of Classification Search
CPC combination set(s) only.
See application file for complete search history.

(56) References Cited

U.S. PATENT DOCUMENTS 4,669,501 A * 6/1987 Takahashi ............ B60K 15/077
137/571
4,886,031 A * 12/1989 Scheurenbrand .... B60K 15/077
137/574

(Continued)

FOREIGN PATENT DOCUMENTS

DE         4338504 A1 *  5/1995  ........... F02M 37/025
DE   102009047331 A1    6/2011

(Continued)

OTHER PUBLICATIONS

International Search Report and Written Opinion dated Feb. 14, 2019.

*Primary Examiner* — Nathan C Zollinger
(74) *Attorney, Agent, or Firm* — Dickinson Wright PLLC

(57) ABSTRACT

A sucking jet pump arrangement, with a sucking jet pump comprising a primary fluid inlet for feeding a fuel driving stream to the sucking jet pump, a secondary fluid inlet for feeding the sucking jet pump with the fuel to be delivered, a fluid outlet for outputting the fuel, and a collection container surrounding a first end of the sucking jet pump opposite of the fluid outlet. The container preferably surrounds the primary fluid inlet from at least three sides such that the sucking jet pump sucks fuel via the secondary fluid inlet out of the inner volume of the collection container. The collection container has at least one fuel inlet opening for feeding fuel from the outside to the inner volume of the collection container.

16 Claims, 5 Drawing Sheets

(56) References Cited

U.S. PATENT DOCUMENTS

| | | | | |
|---|---|---|---|---|
| 5,016,670 A | * | 5/1991 | Sasaki | F02M 37/103 |
| | | | | 123/514 |
| 6,058,911 A | * | 5/2000 | Hashimoto | B60K 15/077 |
| | | | | 123/514 |
| 6,109,299 A | * | 8/2000 | Hashimoto | F02M 37/025 |
| | | | | 123/514 |
| 8,511,340 B2 | * | 8/2013 | Smid | F04F 5/46 |
| | | | | 417/186 |
| 9,752,543 B2 | * | 9/2017 | Ikeya | F02M 37/106 |

FOREIGN PATENT DOCUMENTS

| | | | |
|---|---|---|---|
| DE | 102016207459 A1 | | 11/2017 |
| JP | 50106717 U | * | 9/1975 |

* cited by examiner

SUCKING JET PUMP ARRANGEMENT

RELATED APPLICATIONS

The present patent document claims the benefit of and priority to PCT Application No. PCT/IB2018/060459, filed Dec. 20, 2018, and European Patent Application 17211129.6, filed Dec. 29, 2017, and entitled "Sucking Jet Pump Arrangement" the entire contents of which are incorporated herein by reference.

FIELD

The present disclosure is related to a sucking jet pump arrangement.

BACKGROUND

It is known to use sucking jet pumps for delivering fuel inside a fuel tank of an automobile. FIG. 4 shows a typical arrangement which is known from the prior art in which the tank 100 comprises a main side 102 and a subside 104. The fuel pump 106 for delivering fuel to an internal combustion engine is arranged in the main side 102 of the fuel tank 100. For delivering fuel from the subside 104 to the main side 102 a jet pump 12 is arranged at the tank bottom 108 of the sub side 104.

For driving the jet pump 12, the main fuel pump 106 delivers fuel at a certain pressure to the sucking jet pump 12 through a supply line. Using the Venturi principle, the sucking jet pump 12 sucks fuel from the sub side 104 and delivers it to the main side 106 using a recirculation line. The jet pump 12 is running all the time no matter if fuel is stored in the sub side 104 or if it is empty.

When the fuel tank is reaching a low fuel level, the sub side 104 is almost empty, since most of the remaining fuel has already been delivered to the main side 102 by the jet pump 12. However, the fuel pump 106 is still delivering fuel to the jet pump 12 through the supply line. Since there is no, or minimal, fuel left in the sub side 104, the jet pump 12 can run empty, especially in inclined positions of the automobile or during acceleration (speed-up, breaking or cornering).

We have found this can cause losses because fuel from the supply line escapes through the jet pump 12 to the sub side 104. Thereby the fuel reservoir, in which the main pump module 106 is arranged, will be emptied much faster.

BRIEF SUMMARY

It is an object of the present disclosure to provide a sucking jet pump arrangement with an improved reserve for different driving conditions and to avoid jet pump losses.

The present disclosure is related to a sucking jet pump arrangement with a sucking jet pump comprising a primary fluid inlet for feeding a fuel driving stream to the sucking jet pump, a secondary fluid inlet for feeding the sucking jet pump with the fuel to be delivered and a fluid outlet for outputting the fuel. The main function of a sucking jet pump is known from the prior art and is therefore not described in more detail.

The sucking jet pump arrangement further comprises a collection container surrounding a first end of the sucking jet pump, this first end being arranged opposite of the fluid outlet of the sucking jet pump. The collection container surrounds in particular the primary fluid inlet, which can be arranged opposite of the fluid outlet. The first end of the sucking jet pump or the primary fluid inlet is surrounded at least from three sides, such that the sucking jet pump sucks fuel via the secondary fluid inlet out of the inner volume of the collection container.

A collection container has at least one fuel inlet opening for feeding fuel from the outside to the inner volume of the collection container.

This collection container helps to reduce fuel loses, i.e. fuel which may return from the supply line thought the sucking jet pump. This is particularly relevant in driving situations in which an acceleration has to be overcome in order to output fluid from the fluid outlet of the sucking jet pump. Such an acceleration can be generated for example when the fluid outlet is arranged geodetically higher than the secondary fluid inlet. Such an acceleration can further be generated during fast cornering or acceleration of the automobile, so that the sucking jet pump tries to deliver fuel against this acceleration force to the fluid outlet. The problem hereby is that the pressure difference, which is needed in order to overcome this acceleration and to deliver fuel properly through the fluid outlet, cannot be reached by the pressure supplied to the sucking jet pump through a supply line, which may be connected to the primary fluid inlet of the sucking jet pump.

By retaining an amount of fuel in the collection container, (which can be for example 5-10 ml of fuel) the pressure difference, which has to be overcome by the pressure supplied to the sucking jet pump via the primary fluid inlet, can be reduced so that the sucking jet pump can deliver fuel properly though the fluid outlet without any fuel flowing back in a wrong direction through the sucking jet pump. Thereby fuel losses can be reduced during special driving situations.

In one form, the fuel inlet opening of the collection container is arranged lower than the secondary fluid inlet of the sucking jet pump. Thereby the level, on which the sucking jet pump sucks fuel from the bottom of the tank, is not increased.

The part of the collection container surrounding the primary fluid inlet or the first end of the sucking jet pump opposite of the fluid outlet preferably has a U-shaped cross section when seen from above.

This is one embodiment of the inventive collection container, which may be sufficient to reduce fuel losses in the most crucial driving situations, since by such a collection container fuel can be retained in the area of the secondary fluid inlet when this secondary fluid inlet is in the geodetically lowest position when compared to the fluid outlet so that the pressure difference, which needs to be overcome by the pressure supplied to the sucking jet pump by the primary fluid inlet, is at its maximum. During this most crucial driving situation, it may be sufficient to use a U-shaped collection container surrounding the primary fluid inlet and the secondary fluid inlet so that the pressure difference, which needs to be overcome, can be reduced as explained above.

In one form, the upper edge of the two sidewalls of the U-shaped part of the collection container have a sloping shape with their highest points being at the backside wall of the U-shaped part. By this feature, it is possible to reduce the amount of material, which is needed for producing the collection container for example during an injection molding process. It is not necessary that the two sidewalls of the U-shaped part of the collection container extend horizontally, since an acceleration force in a direction opposite to the fuel delivering direction of the sucking jet pump towards the fluid outlet will let the fluid level rise in a direction away from the fluid outlet. For example, if there is an acceleration of 1 g, the fluid level will rise at an angle of 45° in a direction away from the fluid outlet of the sucking jet pump. This feature will be described in more detail in the context of the figures.

In another form, the collection container comprises a second U-shaped part arranged in an angle of 90° with regard to the first U-shaped part, one sidewall of the second U-shaped part being connected with one sidewall of a first U-shaped part. By this feature acceleration forces in other directions can be compensated (for example during less crucial driving situations, which nevertheless might generate fuel losses).

In this form, the upper edge of the two sidewalls of the second U-shaped part of the collection container preferably have a sloping shape with their highest point at the backside wall of the second U-shaped part.

The sidewalls of the first U-shaped part of the collection container preferably extend beyond the secondary fluid inlet, such that fuel in the area of the secondary fluid inlet can be retained by these sidewalls. As an alternative or in addition to that the backside wall of the second U-shaped part of the collection container may extend beyond the secondary fluid inlet, such that fluid in the area of this secondary fluid inlet can be retained by this backside wall. In other words, it is not necessary for the collection container to completely surround the sucking jet pump. It is sufficient that the collection container extends to the area of the secondary fluid inlet, so that fuel can be retained in this area during crucial driving situations.

The sloping edge of the first and/or second U-shaped part of the collection container is preferably sloped at an angle of at least 30°, more preferably at least 35° and most preferably at least 40° when compared with the lower side of the sucking jet pump. As explained above, an angle of 45° may be sufficient in order to compensate accelerations of up to 1 g, which helps to reduce fuel losses during most driving situations. In fact, tests performed by the applicant have shown that even lower angles can be used in order to reduce fuel losses of the sucking jet pump.

In form, the collection container has a snail-shape or spiral-shape when seen from above, the collection container surrounding the sucking jet pump preferably for at least 450°. In other words, the collection container when seen from above has the shape of a labyrinth, thereby preventing fuel from the leaving the area around the secondary fluid inlet during critical driving situations.

In this embodiment it is preferred that at least one of the outer walls of the snail-shaped or spiral-shaped collection container comprises the at least one fuel inlet opening for feeding fuel from the outside (i. e. from the volume of the tank) to the inner volume of the collection container.

BRIEF DESCRIPTION OF THE DRAWINGS

In the following preferred embodiments of the present disclosures are explained in the context of the figures.

DETAILED DESCRIPTION

Figure 4:
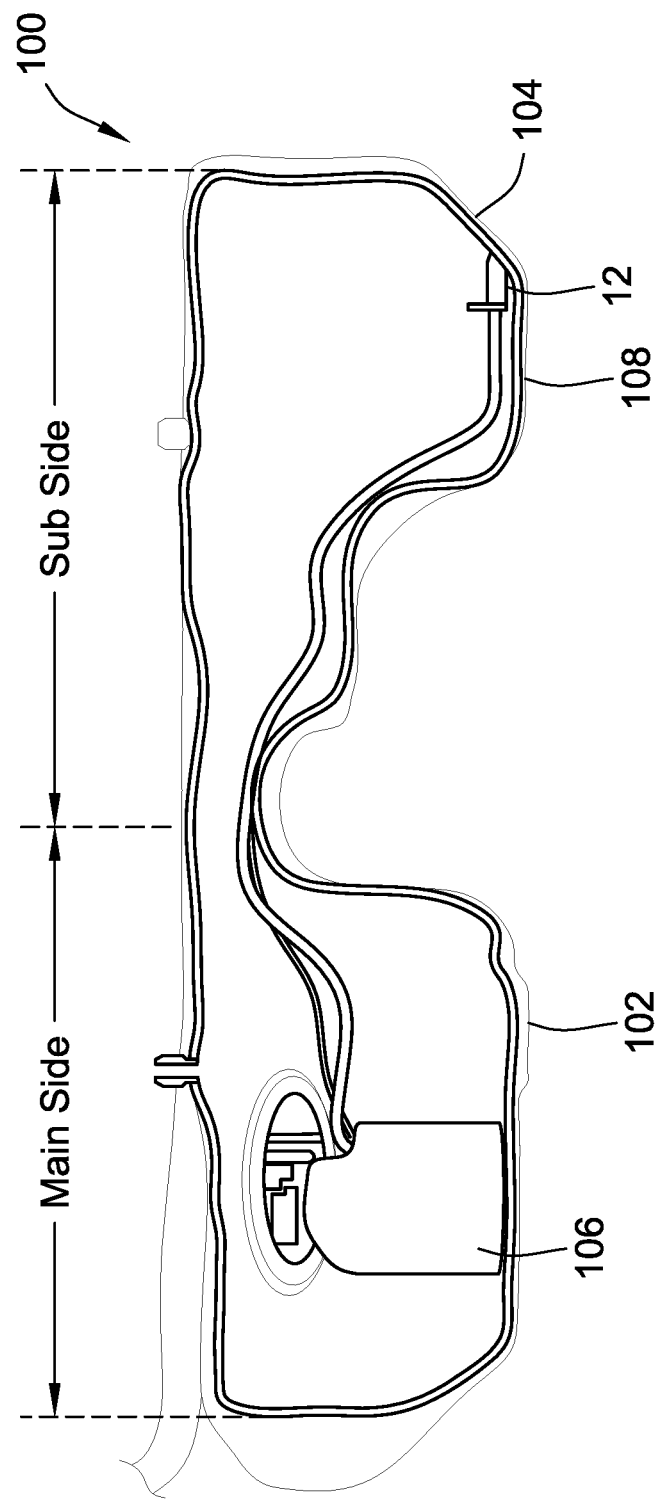
FIG. 4 shows a fuel tank with a sucking jet pump as it is known from prior art.

FIG. 4 has already been described in the introduction of the present application.

The inventive sucking jet pump arrangement can be used for the sucking jet pump 12 of the subside 104 of a fuel tank 100 as it is shown in FIG. 4. The sucking jet pump 12 may also be known as a suction jet pump.

A simple embodiment of a collection container 20 is shown in FIGS. 1a-1d. This collection container 20 has a U-shaped cross section when seen from above. The collection container 20 surrounds the primary fluid inlet 14 of the sucking jet pump 12 and sidewalls 28a, 28b of the collection container 20 extend beyond the area of the secondary fluid inlet 16, so that fluid can be retained by the sidewalls in this area.

The two sidewalls 28, 28b of the U-shaped part 25 of the collection container 20 have a sloping shape with their highest point being at the backside wall 26 of the U-shaped part 25. It is preferred that the sloping edge of the sidewalls 28a, 28b is sloped at an angle of at least 40° when compared with the lower side of the sucking jet pump (i. e. the plain of the tank bottom). The highest point of the sidewalls 28a, 28b is at the backside wall 26 of the U-shaped part 25.

At the opposite side the collection container has a fuel inlet opening 24 for feeding fuel from the outside to the inner volume 22 of the collection container 20.

The grid-shaped element surrounding the secondary fluid inlet 16 serves as a filter for avoiding that bigger objects enter this fluid inlet 16.

Figure 1A:
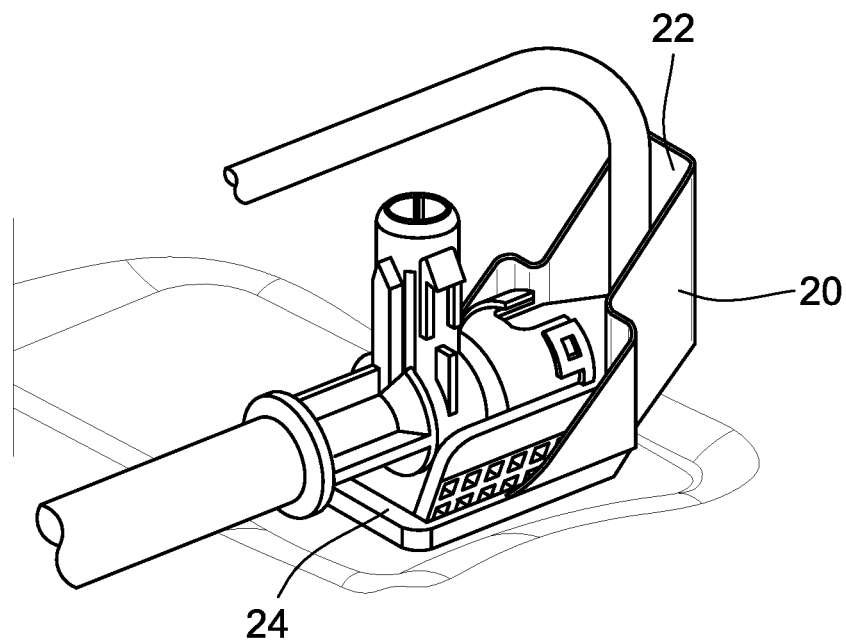
FIGS. 1a-1d show a first embodiment of the present disclosure.
Figure 1B:
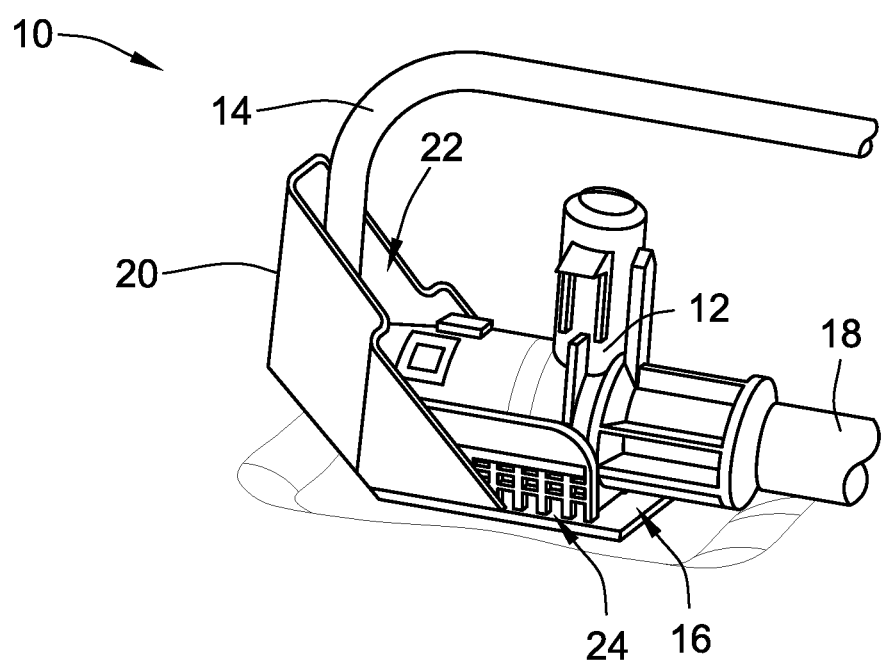
Figure 1C:
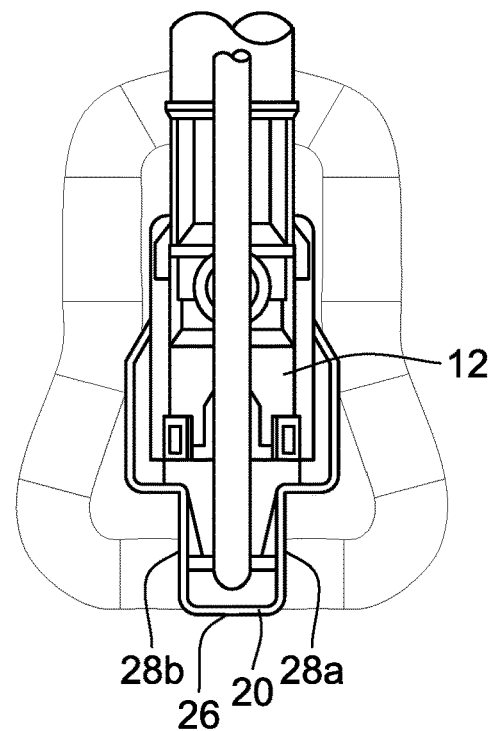
Figure 1D:
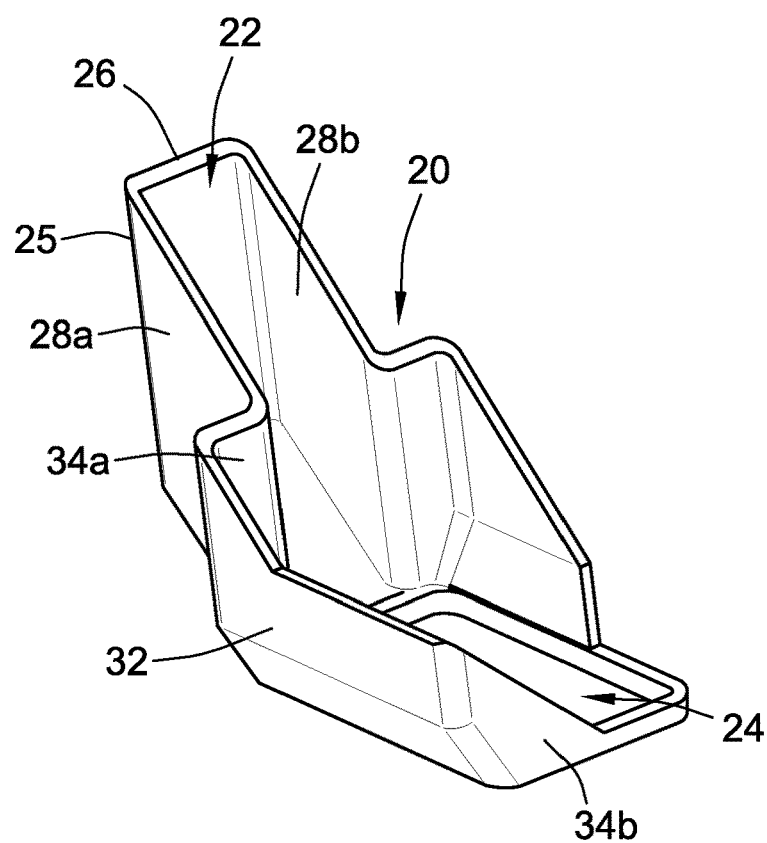

In contrast to the collection container 20 shown in FIGS. 1a-1d, the collection container 20 of FIG. 1d has a second U-shaped part 30 arranged in an angle of 90° with regard to the first U-shaped part, whereby one sidewall 34a of the second U-shaped part 30 is connected with one sidewall 28a of the first U-shaped part 25. At least the one upper edge 34b of the second U-shaped part 30 of the collection container 20 can have a sloping shape with its highest point being at the backside 32 of the second U-shaped part 30. By this second U-shaped part 30 acceleration forces in a second direction can be compensated so that fuel losses in the sucking jet pump 12 during more driving situations can be prevented.

Figure 2A:
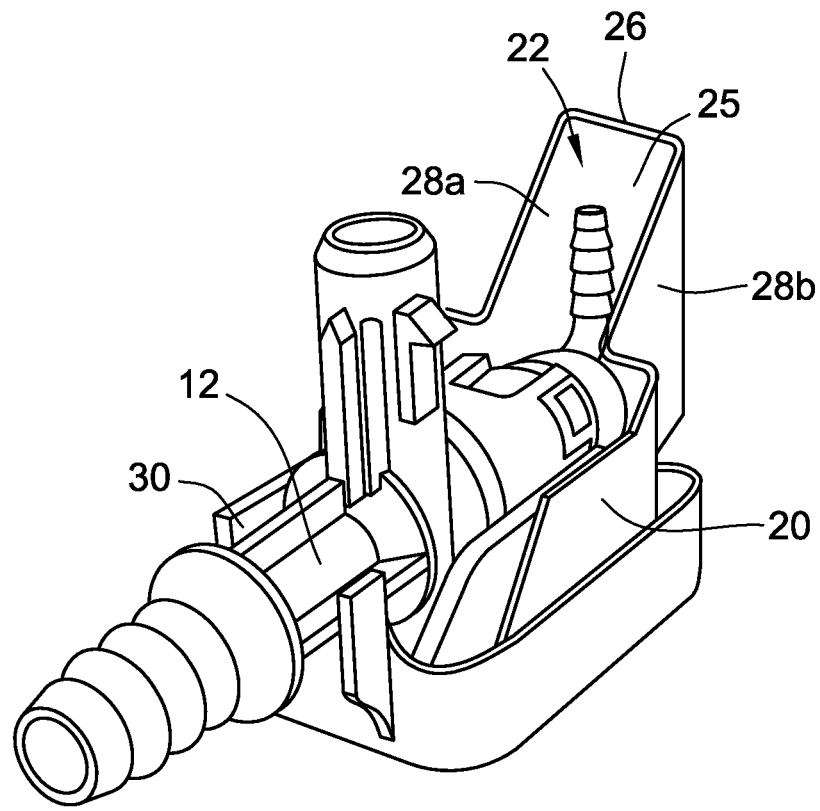
FIGS. 2a-2b and FIGS. 3a-3c show a second embodiment of the present disclosure.
Figure 2B:
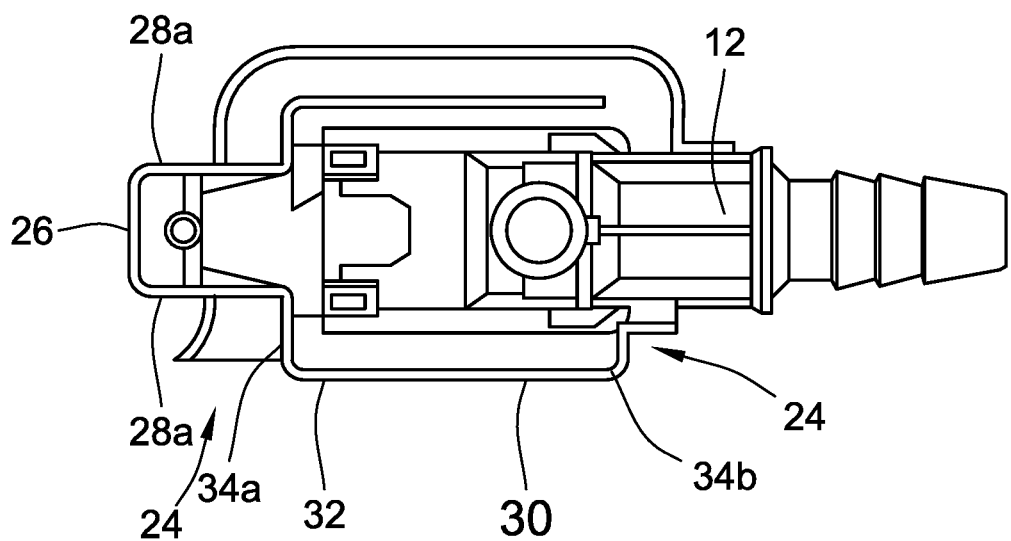

A second embodiment of the invention is shown in FIGS. 2a-2c. Here, the collection container 20 has a snail-shape or spiral-shape when seen from above, whereby the collection container 20 surrounds the sucking jet pump 12 for at least 450°. Therefore, the collection container 20 has a labyrinth shape as can be best seen in FIG. 2b, thereby preventing fuel from escaping the inside of the collection container 20.

As can be seen in FIG. 2c, the collection container 20 has at least two fuel inlet openings 24 for feeding fuel from the outside to the inner volume 22 of the collection container 20.

Figure 3A:
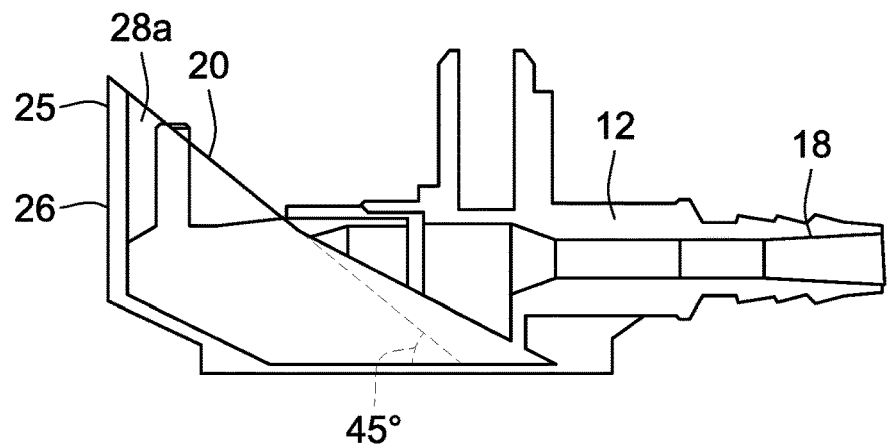
Figure 3B:
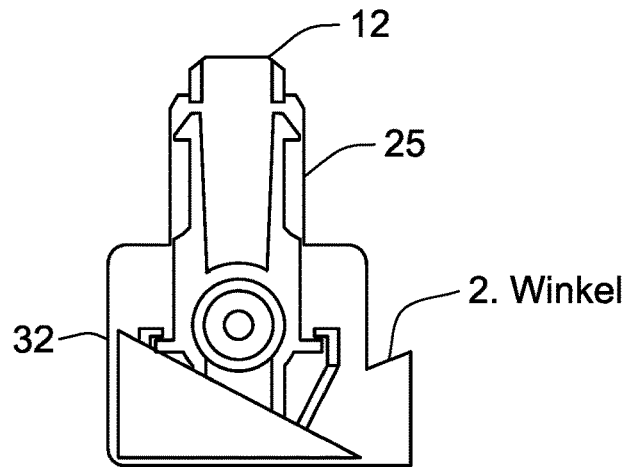
Figure 3C:
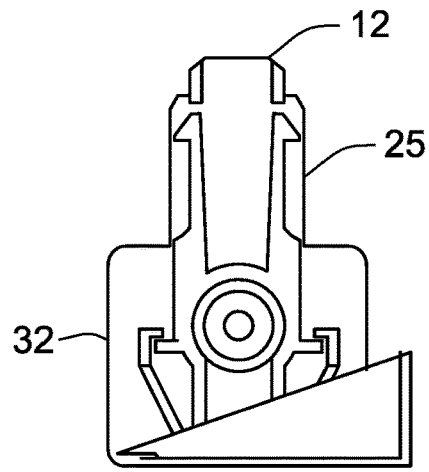

Some typical driving situations are shown in FIGS. 3a-3c. For example, as shown in FIG. 3a, fuel is pressed against the backside wall 26 of the first U-shaped part 25 of the collection container 20 during fast cornering. This may be the most crucial driving situation, since the acceleration force is directed against the direction in which the sucking jet pump 12 delivers fuel though the fluid outlet 18. Therefore, in this important driving situation, it is important to prevent fuel from escaping over the backside wall 26 of the first U-shaped part 25 of the collection container 25. For that reason that first U-shaped part 25 has its highest point at the backside 26, whereby the sidewalls 28a, 28b have a sloping shape with their highest point being at the backside 26 of the first U-shaped part 25. As explained above, by using an angle of approx. 45° between the plane of the tank bottom and the upper edge of the sidewall 28a, acceleration forces of up to 1 g can be compensated.

In FIGS. 3b and 3c acceleration forces in a direction perpendicular to FIG. 3a are shown, which can occur during acceleration of deceleration.

The invention claimed is:

1. A sucking jet pump arrangement, comprising:
a sucking jet pump having a primary fluid inlet for feeding a fuel driving stream to the sucking jet pump;
a secondary fluid inlet for feeding the sucking jet pump with fuel to be delivered;
a fluid outlet for outputting fuel;
a collection container surrounding a first end of the sucking jet pump opposite of the fluid outlet at least from three sides such that the sucking jet pump sucks fuel via the secondary fluid inlet out of the inner volume of the collection container; and
the collection container having at least one fuel inlet opening for feeding fuel from the outside to the inner volume of the collection container;
wherein a part of the collection container that surrounds the primary fluid inlet has a U-shaped cross section when seen from above, and wherein an upper edge of two sidewalls forming the U-shaped part of the collection container have a sloping shape with their highest point being at a backside wall of the U-shaped part, and wherein the collection container has a second U-shaped part with a second backside wall arranged at an angle of 90° with regard to the backside wall of the first U-shaped part, one sidewall of the second U-shaped part being connected with one sidewall of the first U-shaped part.

2. The sucking jet pump arrangement according to claim 1, wherein the fuel inlet opening of the collection container is arranged lower than the secondary fluid inlet of the sucking jet pump.

3. The sucking jet pump arrangement according to claim 1, wherein an upper edge of the two sidewalls of the second U-shaped part of the collection container have a sloping shape with their highest point being at a backside wall of the second U-shaped part.

4. The sucking jet pump arrangement according to claim 1, wherein the sidewalls of the first U-shaped part of the collection container extend beyond the secondary fluid inlet such that fuel in the area of the secondary fluid inlet can be retained by the sidewalls.

5. The sucking jet pump arrangement according to claim 1, wherein the sloping edge of at least one of the first and second U-shaped part of the collection container is sloped at an angle of at least 30° to 40° when compared to the lower side of the sucking jet pump.

6. The sucking jet pump arrangement according to claim 1, wherein the collection container has a spiral-shape when seen from above.

7. The sucking jet pump arrangement according to claim 6, wherein at least one of the outer walls of the spiral-shaped collection container comprises the at least one fuel inlet opening for feeding fuel from the outside to the inner volume of the collection container.

8. The sucking jet pump arrangement according to claim 1, wherein the collection container surrounds the primary fluid inlet of the sucking jet pump.

9. The sucking jet pump arrangement according to claim 1, wherein the backside wall of the second U-shaped part of the collection container extends beyond the secondary fluid inlet such that fuel in the area of the secondary fluid inlet can be retained by this backside wall.

10. The sucking jet pump arrangement according claim 6, wherein the collection container surrounds the sucking jet pump such that the spiral-shape extends for about 450° around the sucking jet pump.

11. The sucking jet pump arrangement according to claim 1, wherein the collection container has a snail-shape when seen from above.

12. A sucking jet pump arrangement, comprising:
a sucking jet pump having a primary fluid inlet for feeding a fuel driving stream to the sucking jet pump;
a secondary fluid inlet for feeding the sucking jet pump with fuel to be delivered;
a fluid outlet for outputting fuel;
a collection container surrounding a first end of the sucking jet pump opposite of the fluid outlet at least from three sides such that the sucking jet pump sucks fuel via the secondary fluid inlet out of the inner volume of the collection container; and
the collection container having at least one fuel inlet opening for feeding fuel from the outside to the inner volume of the collection container;
wherein a part of the collection container that surrounds the primary fluid inlet has a U-shaped cross section when seen from above;
wherein the collection container has a second U-shaped part arranged in an angle of 90° with regard to the first U-shaped part, one sidewall of the second U-shaped part being connected with one sidewall of the first U-shaped part, and wherein an upper edge of the two sidewalls of the second U-shaped part have a sloping shape with their highest point being at a backside wall of the second U-shaped part.

13. The sucking jet pump arrangement according to claim 12, wherein the fuel inlet opening of the collection container is arranged lower than the secondary fluid inlet of the sucking jet pump.

14. The sucking jet pump arrangement according to claim 12, wherein an upper edge of two sidewalls forming the U-shaped part of the collection container have a sloping shape with their highest point being at a backside wall of the U-shaped part.

15. The sucking jet pump arrangement according to claim 12, wherein the sidewalls of the first and second U-shaped parts of the collection container extend beyond the secondary fluid inlet such that fuel in the area of the secondary fluid inlet can be retained by the sidewalls of the first and second U-shaped parts.

16. The sucking jet pump arrangement according to claim 12, wherein the collection container has a spiral-shape when seen from above, and wherein at least one of the outer walls of the spiral-shaped collection container comprises the at least one fuel inlet opening for feeding fuel from the outside to the inner volume of the collection container.

* * * * *